US009553820B2

(12) United States Patent
Shumsky et al.

(10) Patent No.: US 9,553,820 B2
(45) Date of Patent: Jan. 24, 2017

(54) MAINTAINING PACKET ORDER IN A PARALLEL PROCESSING NETWORK DEVICE

(71) Applicant: Marvell Israel (M.I.S.L) Ltd., Yokneam (IL)

(72) Inventors: Evgeny Shumsky, Petah Tikva (IL); Gil Levy, Hod Hasharon (IL); Adar Peery, Aseret (IL); Amir Roitshtein, Holon (IL)

(73) Assignee: Marvell Israel (M.L.S.L) Ltd., Yokneam (IL)

( * ) Notice: Subject to any disclaimer, the term of this patent is extended or adjusted under 35 U.S.C. 154(b) by 241 days.

(21) Appl. No.: 14/209,513

(22) Filed: Mar. 13, 2014

(65) Prior Publication Data
US 2014/0192815 A1 Jul. 10, 2014

Related U.S. Application Data

(63) Continuation-in-part of application No. 14/109,479, filed on Dec. 17, 2013.
(Continued)

(51) Int. Cl.
*H04L 12/28* (2006.01)
*H04L 12/863* (2013.01)
(Continued)

(52) U.S. Cl.
CPC ....... *H04L 47/6295* (2013.01); *H04L 47/6215* (2013.01); *H04L 49/552* (2013.01); *H04L 49/9057* (2013.01); *H04L 49/9015* (2013.01)

(58) Field of Classification Search
CPC ........... H04L 47/10; H04L 47/34; H04L 47/50
See application file for complete search history.

(56) References Cited

U.S. PATENT DOCUMENTS 5,764,895 A    6/1998   Chung
7,864,764 B1 *   1/2011   Ma ....................... H04L 12/413
                                                          370/389
(Continued)

FOREIGN PATENT DOCUMENTS

WO      WO 99/07180      2/1999

OTHER PUBLICATIONS

International Preliminary Report on Patentability in International Application No. PCT/IB2013/003195, dated Jul. 2, 2015 (8 pages).
(Continued)

*Primary Examiner* — Shaq Taha

(57) ABSTRACT

A plurality of packets that belong to a data flow are received and are distributed to two or more packet processing elements, wherein a packet is sent to a first packet processing element. A first instance of the packet is queued at a first packet processing element according to an order of the packet within the data flow. The first instance of the packet is caused to be transmitted when processing of the first instance is completed and the first instance of the packet is at a head of a queue at the first ordering unit. A second instance of the packet is queued at a second ordering unit. The second instance of the packet is caused to be transmitted when processing of the second instance is completed and the second instance of the packet is at a head of a queue at the second ordering unit.

20 Claims, 7 Drawing Sheets

Related U.S. Application Data

(60) Provisional application No. 61/825,223, filed on May 20, 2013, provisional application No. 61/780,186, filed on Mar. 13, 2013, provisional application No. 61/768,069, filed on Feb. 22, 2013, provisional application No. 61/738,264, filed on Dec. 17, 2012.

(51) Int. Cl.
*H04L 12/861* (2013.01)
*H04L 12/939* (2013.01)
*H04L 12/883* (2013.01)

(56) References Cited

U.S. PATENT DOCUMENTS

| | | | |
|---|---|---|---|
| 7,924,860 | B1 | 4/2011 | Frailong et al. |
| 8,111,690 | B2 | 2/2012 | Hussain et al. |
| 8,310,927 | B1 * | 11/2012 | Cohen .................. H04L 12/413 370/231 |
| 2006/0239194 | A1 | 10/2006 | Chapell |
| 2008/0114887 | A1 | 5/2008 | Bryers et al. |
| 2009/0296580 | A1 | 12/2009 | Williams, Jr. et al. |
| 2012/0002546 | A1 | 1/2012 | Sundararaman et al. |
| 2012/0177047 | A1 | 7/2012 | Roitshtein |
| 2013/0070584 | A1 | 3/2013 | Hutchison et al. |
| 2014/0029449 | A1 * | 1/2014 | Xu ......................... H04L 43/10 370/252 |
| 2014/0169378 | A1 | 6/2014 | Shumsky et al. |
| 2014/0177470 | A1 | 6/2014 | Roitshtein et al. |
| 2015/0172188 | A1 | 6/2015 | Levy et al. |

OTHER PUBLICATIONS

Notice of Allowance in U.S. Appl. No. 14/109,479, dated Oct. 26, 2015 (8 pages).

U.S. Appl. No. 14/574,088, Levy et al., "Increasing Packet Processing Rate in a Network Device," filed Dec. 17, 2014.

U.S. Appl. No. 14/610,834, Levy et al., "Packet Distribution with Prefetch in a Parallel Processing Network Device," filed Jan. 30, 2015.

Office Action in U.S. Appl. No. 14/109,479 dated May 22, 2015 (12 pages).

International Search Report and Written Opinion for corresponding PCT Application No. PCT/IB2014/000865 dated Aug. 26, 2014 (13 pages).

Shumsky, et al, "Multithreaded Parallel Packet Processing in Network Devices," U.S. Appl. No. 14/092,521, filed Nov. 27, 2013 (27 pages).

Kadosh, et al, "Multi-Stage Interconnect Network in a Parallel Processing Network Device," U.S. Appl. No. 14/482,980, filed Sep. 10, 2014 (46 pages).

Levy, et al, "Packet Parsing and Key Generation in a Network Device," U.S. Appl. No. 14/516,500, filed Oct. 16, 2014 (50 pages).

Wohlgemuth, et al., "Processing Concurrency in a Network Device," U.S. Appl. No. 14/516,529, filed Oct. 16, 2014 (59 pages).

Wohlgemuth, et al., "Processing Concurrency in a Network Device," U.S. Appl. No. 14/517,570, filed Oct. 17, 2014 (51 pages).

International Search Report and Written Opinion for International Application No. PCT/IB2013/003195, mailed Jun. 3, 2014.

Shpiner et al., "Reducing the Reordering Delay in Multi-Core Network Processors", Technical Report TR12-01, Com net, Technion, Israel, Jan. 2012, 12 pages.

* cited by examiner

MAINTAINING PACKET ORDER IN A PARALLEL PROCESSING NETWORK DEVICE

CROSS-REFERENCE TO RELATED APPLICATION

The present application is a continuation-in-part of U.S. patent application Ser. No. 14/109,479, entitled "Maintaining Packet Order in a Parallel Processing Network Device," which was filed on Dec. 17, 2013, which claims the benefit of the following U.S. Provisional Patent Applications: U.S. Provisional Patent Application No. 61/738,264, entitled "Packet Reorder Method in Parallel Processing Packet Processor," filed on Dec. 17, 2012; U.S. Provisional Patent Application No. 61/768,069, entitled "Lock Mechanism," filed on Feb. 22, 2013; U.S. Provisional Patent Application No. 61/780,186, entitled "Packet Reorder Method in Parallel Processing Packet Processor," filed on Mar. 13, 2013; and U.S. Provisional Patent Application No. 61/825,223, entitled "Packet Reorder Method in Parallel Processing Packet Processor," filed on May 20, 2013. The present application also claims the benefit of U.S. Provisional Patent Application No. 61/780,186, entitled "Packet Reorder Method in Parallel Processing Packet Processor," filed on Mar. 13, 2013; and U.S. Provisional Patent Application No. 61/825,223, entitled "Packet Reorder Method in Parallel Processing Packet Processor," filed on May 20, 2013. The disclosures of all of the above-referenced patent applications are hereby incorporated by reference herein in their entireties.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like employ parallel packet processing of packet streams in which multiple packet processing elements simultaneously and in parallel perform processing of different packets. In such embodiments, it is important to efficiently utilize multiple processing elements to concurrently perform parallel processing of packets belonging to a data flow while efficiently maintaining an order of packets within the data flow.

SUMMARY

In an embodiment, a method for processing packets in a network device includes receiving a plurality of packets at a port of the network device, wherein the plurality of packets belong to a data flow. The method also includes distributing the packets among two or more packet processing elements for processing of the packets, including distributing a packet of the plurality of packet to a first packet processing element for processing of the packet by the first packet processing element. The method additionally includes queuing, at a first ordering unit, a first instance of the packet according to an order of the packet within the data flow. The method further includes causing the first instance of the packet to be transmitted when both of (i) processing of the first instance of the packet is completed and (ii) the first instance of the packet is at a head of a queue at the first ordering unit. The method further yet includes queuing, at a second ordering unit, a second instance of the packet according to the order of the packet within the data flow. The method further still includes causing the second instance of the packet to be transmitted when both of (i) processing of the second instance of the packet is completed and (ii) the second instance of the packet is at a head of a queue at the second ordering unit.

In another embodiment, a network device comprises a plurality of network ports configured to receive and to transmit packets on a network. The network device also comprises a plurality of packet processing elements configured to process packets received via the network ports. The network device further comprises a plurality of ordering units including at least a first ordering unit and a second ordering unit. The first ordering unit is configured to distribute a plurality of packets among two or more packet processing elements for processing of the packets, wherein the plurality of packets belong to a data flow. The first ordering unit is also configured to queue a first instance of a packet of the plurality of packets according to an order of the packet within the data flow. The first ordering unit is additionally configured to cause the first instance of the packet to be transmitted when both of (i) processing of the first instance of the packet is completed and (ii) the first instance of the packet is at a head of a queue at the first ordering unit. The first ordering unit is further configured to cause a second instance of the packet to be queued at a second instance of the packet according to an order of the packet within the data flow. The second ordering unit is configured to cause the second instance of the packet to be transmitted when both of (i) processing of the second instance of the packet is completed and (ii) the second instance of the packet is at a head of a queue at the second ordering unit.

DETAILED DESCRIPTION

Figure 1:
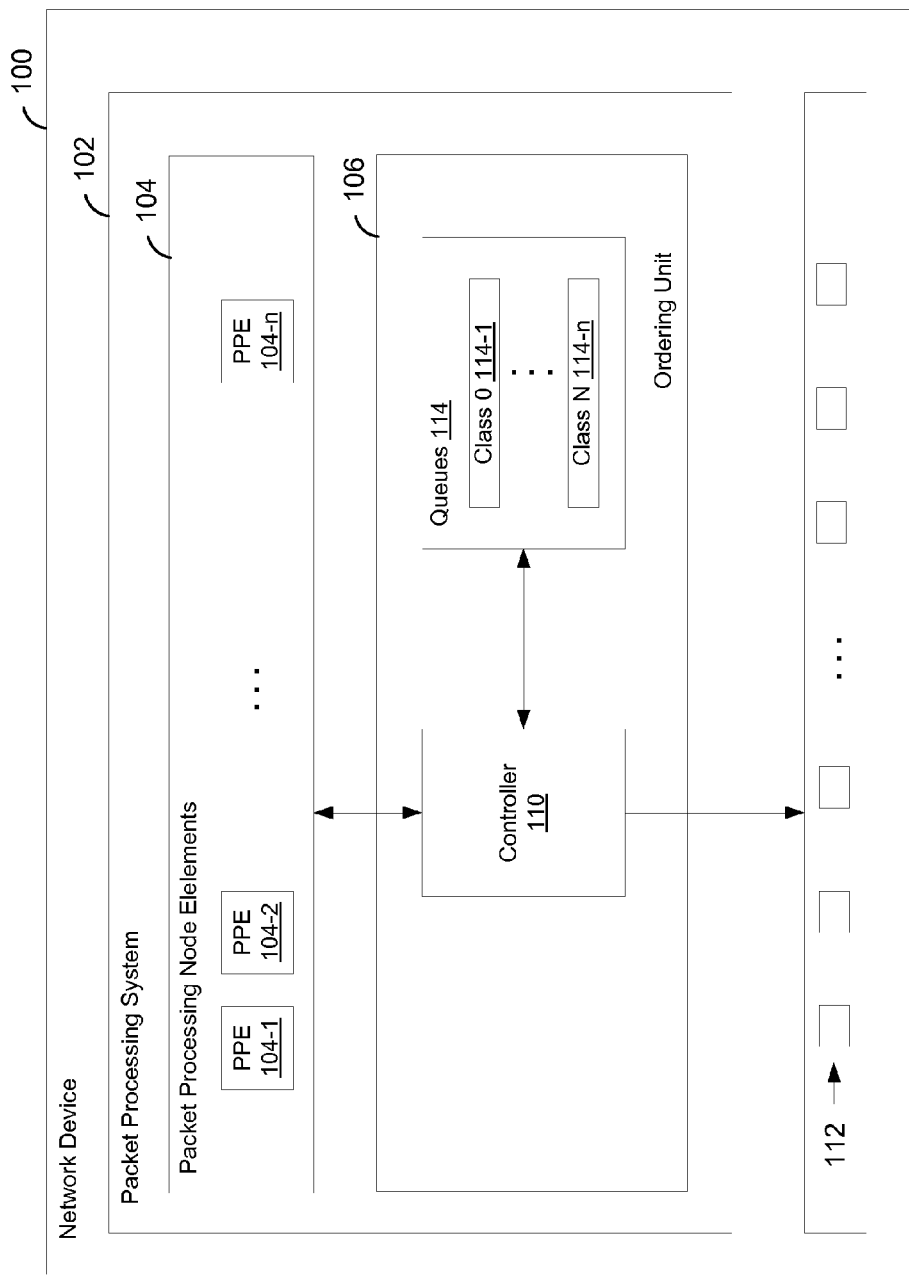
FIG. 1 is a block diagram of an example network device, according to an embodiment.

FIG. 1 is a block diagram of an example network device 100 configured to distribute network packets in a data flow for parallel processing by a plurality of packet processing elements and to maintain order of packets within the data flow as the packets are transmitted from the network device 100, according to an embodiment. The network device 100 is generally a computer networking device that connects two or more computer systems, network segments, subnets, and so on. For example, the network device 100 is a switch, in one embodiment. It is noted, however, that the network device 100 is not necessarily limited to a particular protocol layer or to a particular networking technology (e.g., Ethernet). For instance, the network device 100 could also be a bridge, a router, a VPN concentrator, etc.

The network device 100 includes a packet processor 102, and the packet processor 102, in turn, includes a plurality of packet processing elements (PPEs) 104 and an ordering unit 106. The network device 100 also includes a plurality of network ports 112 coupled to the packet processor 102, and each of the network ports 112 is coupled via a respective communication link to a communication network and/or to another suitable network device within a communication network. Generally speaking, the packet processor 102 is configured to process packets received via ingress ports 112, to determine respective egress ports 112 via which the packets are to be transmitted, and to transmit the packets via the determined egress ports 112. In some embodiments, the packet processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet.

The ordering unit 106 includes a controller 110 configured to distribute processing of packets received by the network device 100 via the ports 112 to the plurality of PPEs 104. The PPEs 104 are configured to concurrently, in parallel, perform processing of respective packets, and each PPE 104 is generally configured to perform at least two different processing operations on the packets, in an embodiment. According to an embodiment, the PPEs 104 are configured to process packets using computer readable instructions stored in a non-transitory memory (not shown), and each PPE 104 is configured to perform all necessary processing (run to completion processing) of a packet. In operation, the network device 100 processes one or more data flows that traverse the network device 100. In an embodiment, a data flow corresponds to a sequence of packets received by the network device 100 via a certain source port 112 (e.g., from a certain originating device) and destined for transmission via a certain target port 112 (e.g., to a certain target device coupled to the target port), and, in some embodiments, is associated with one or more other parameters, such as a priority level relative to other data flows. A data flow that is directed to only a single target device is generally referred to herein as a unicast data flow. The network device 100 is configured to process multicast data flows directed to groups of target devices, in addition to or instead of unicast data flows directed to only one target device, in at least some embodiments.

Typically, order of data packets in a data flow needs to be maintained through the network device 100 such that the order in which the packets are transmitted from the network device 100 is the same as the order in which the packets were received by the network device 100. However, because processing of packets in a data flow is distributed among multiple ones of the PPEs 104, processing of the packets in the data flow is completed by the PPEs 104 in an order different than the order in which the packets were received by the network device 100, in at least some situations. Out of order completion of processing of the packets is due, for example, to variance in latency encountered by different PPEs 104 when accessing an external resource, such as external memory, an external processing engine, etc. for performing a processing operation on a packet.

In an embodiment, the ordering unit 106 is configured to maintain order of at least the packets belonging to a same data flow entering the network device 100 to ensure that these packets are transmitted from the network device 100 in the order in which the packets were received by the network device 100. To efficiently maintain the order of packets, the controller 110 operates on a plurality of queues 114-1 through 114-n corresponding to respective packet classes, and maintains the order of packets within each class of the plurality of classes. A packet class corresponds to a group of packets that share one or more attributes associated with the packets, in various embodiments. For example, a packet class corresponds to a group of packets that belong to a same data flow, a group of packets that belong to several data flows (e.g., several data flows that share a priority level), packets that share a number of instructions that the PPEs 104 need to execute in order to process the packets, a group of packets that share an expected processing time, or a group of packets that share any other suitable attribute or suitable combinations of attributes associated with the packets. In an embodiment, the classes are predefined in the network device 100. In another embodiment, at least some of the classes are configurable by an operator of the network device 100.

In an embodiment, the controller 110 queues packets in respective queues 114 corresponding to respective packet classes associated with the packets according to an order in which the packets were received by the network device 100. In an embodiment, the controller 110 assigns packet IDs to the packets, and queues the packet IDs assigned to the packets, rather than the packets themselves, in the queues 114. In an embodiment, the controller 110 assigns the packet IDs from a pool of non-sequential free packet IDs. In this embodiment, packet IDs assigned to packets in a sequence of packets received by the network device 100 do not necessarily represent the order in which the packets were received by the network device 100. The controller 110 then distributes the packets to the PPEs 104 for processing of the packets by the PPEs 104. In an embodiment, the PPEs 104 generally process the packets independently of the order in which the packets are queued in the queues 114. In an embodiment, the PPEs 104 are configured to perform at least some processing operations on the packets independently of respective locations of the packets in the respective queues 114. The PPEs 104 communicate with the ordering unit 106, for example to instruct the ordering unit 106 to take certain actions with respect to the packets queued in the queues 114. In an embodiment, the PPEs 104 are configured to issue instructions indicative of actions to be taken with the packets, such as updating a class corresponding to a packet, forwarding a packet to a target port 112 for transmission of the packet via the target port 112, dropping the packet, etc., and to send the instructions indicative of the actions to the ordering unit 106. In other embodiments, other processing elements of the network device 100 instruct the ordering unit 106 to perform an action with respect to a packet, such as to update a class corresponding to a packet. For example, at least some such instructions are sent to the ordering unit 106 from a hardware element (e.g., a hardware processing engine or a lookup memory, such as a ternary content addressable memory (TCAM), for example) that is engaged or accessed by a PPE 104 to determine the class of the packet, in an embodiment.

In various embodiments described below, the controller 110 maintains order of packets queued in a same queue 114 by performing actions with respect to a packet queued in the queue 114 when the packet is at the head of the queue 114. As such, a packet at the head of a queues 114 prevents the controller 110 from performing actions with respect to other packets queued in the same queue 114, thereby blocking the other packets queued in the same queue 114, in such embodiments. In other words, because actions with respect to packets queued in a queue 114 are performed only when the packets are at the head of the queue 114, in an embodiment, the controller 110 delays performing an action with respect to a packet received by the network device 100 at a relatively later time until an action with respect to a packet received at a relatively earlier time is performed, thereby preserving the order of packets queued in the queue 114.

In an embodiment, the queues 114 are implemented using respective linked lists. In this embodiment, each queue 114 links a group of packets via a sequence of entries each of which contains a reference to a next entry in the queue, in an embodiment. Implementing the queues 114 as respective linked lists allows the controller 110 to efficiently utilize a memory space for storing the plurality of queues 114. In another embodiment, the queues 114 are implemented in other suitable manners, for example as First In First Out (FIFO) queues.

According to an embodiment, a class to which a packet corresponds is determined during processing of the packet by a PPE 104 or by another processing element other than the ordering unit 106 (e.g., an external hardware engine engaged to determine the packet class by the PPE 104). Accordingly, the class to which a packet corresponds is not yet known when the packet is received by the ordering unit 106 and initially enqueued in the ordering unit 106. In an embodiment, the controller 110 is configured to initially enqueue packets in one or more default class queues. For example, in some embodiments, the queues 114 include multiple default queues 114, with each default queue 114 configured to queue packets that share a certain parameter that is known to the controller 110 prior to processing of the packets by the PPEs 104. For example, in one such embodiment, the queues 114 include respective default queues 114 for each of the source ports 112 serviced by the ordering unit 106 (e.g., each of all of the source ports 112 or each of some of the source ports 112). In this embodiment, the controller 110 is configured to enqueue a packet in a default queue 114 that corresponds to the source port 112 via which the packet was received by the network device 100. In this embodiment, packets that enter the network device 100 via different ones of the source ports 112 are queued in different default class queues 114, and a packet that entered the network device 100 via a first port 112 (e.g., the ports 112-1) will not unnecessarily block a packet that entered the network device 100 via a second port 112, in an embodiment. In another embodiment, though, the queues 114 include a single default class queue for initially queuing all packets that enter the ordering unit 106. In this embodiment, the controller 110 initially enqueues all packet received by the ordering unit 106 in the single default queue 114.

In an embodiment, the PPEs 104 analyze at least some of the packets being processed by the PPEs 104 to determine respective packet classes corresponding to the at least some of the packets based on one or more attributes associated with the packets (e.g., based on one or more parameters in a header of a packet, based on one or more parameters calculated for the packet during processing of the packet by the packet processor 102, a combination thereof, or any other suitable parameter or parameters included in or otherwise associated with the packet). The PPEs 104 are configured to selectively provide updates corresponding to at least some of the packets to the ordering unit 106 (e.g., to the controller 110 of the ordering unit 106), indicating the determined classes for the packets to the ordering unit 106. In an embodiment, the PPEs 104 provide class updates with respect to some of the packets (e.g., packets for which processing time is expected to be relatively long), and do not provide class updates with respect to other packets (e.g., packets for which processing time is expected to be relatively short).

Alternatively, in another embodiment, the controller 110 is configured to initially enqueue the packets in all of the queues 114. In this embodiment, the controller 110 is configured to receive an update for a packet indicating that the packet does not belong to one or multiple ones of the packet classes corresponding to certain one or multiple ones of the queues 114. In response to receiving an update corresponding to a packet, the controller 110 removes the packet from the one or the multiple ones of the queues 114 corresponding to the indicated class or classes. In an embodiment, the controller 110 is configured to remove the packet from a certain queue only when the packet is at the head of the certain queue.

In an embodiment, the ordering unit 106 receives multiple updates for a packet during processing of the packet by the PPEs 104 and/or by other processing elements of the network device 100. For example, the ordering unit 106 receives an instruction for a packet indicating that the packet should be moved to a temporary class before an actual class to which the packet belongs has been determined by the PPE 104 or other processing element of the network device 100. In response to receiving the instruction indicating that the packet should be moved to a temporary class, the ordering unit 106 moves the packet from the queue 114 in which the packet is currently queued to another one of the queues 114, for example to a queue 114 corresponding to a current class of the packet incremented by an integer, such as one (e.g., class 0 incremented by one to class 1), in an embodiment. Subsequently, the ordering unit 106 receives one or more additional temporary class updates corresponding to the packet until an actual class is determined for the packet, in some embodiments. Performing temporary class updates for a packet allows the controller 110 to unblock other packets in the queue in which the packet is currently queued prior to determining the class to which the packet corresponds, in at least some embodiments.

According to an embodiment, when the ordering unit 106 receives a class update for a particular packet, the controller 110 of the ordering unit 106 moves the packet from a queue 114 in which the packet is currently queued to a new queue 114 corresponding to the class indicated by the class update for the particular packet. In an embodiment, to properly maintain order of packets, the controller 110 does not move packets to new queues 114 until the packets reach heads of queue in which the packets are currently queued. For example, in an embodiment, when the controller 110 receives a class update corresponding to a packet, the controller 110 checks whether the packet is at the head of the queue in which the packet is queued, or, alternatively, checks whether the packet is at the head of any of the queues 114, and performs the class update (e.g., moves the packet to the queue 114 corresponding to the class indicated by the class update) only if the packet is currently at the head of a queue 114. If the packet is not currently at the head of a queue 114, the controller 110 suitably associates the update action with the packet and waits, until the packet reaches the head of the queue in which the packet is queued, to actually perform the update action with respect to the packet.

In some embodiments and/or scenarios, the ordering unit 106 receives a second class update instruction for a packet before a previously received class update for the packet has been performed by the ordering unit 106, such as when the packet has not yet reached the head of the queue in which the packet was queued at the time that the previous update was received by the ordering unit 106. In such cases, the controller 110 suitably associates the update action corresponding to the second update instruction with the packet, in an embodiment. Accordingly, in this case, both a first class update action corresponding to the previously received class update instruction and a second class update action corresponding to the second class update instruction are associated with the packet, in this embodiment. The controller 110 performs each of the first and the second update actions when the packet reaches the head of the relevant queue 114, in an embodiment. In other words, the controller 110 performs the first update action when the packet reaches the head of the queue 114 in which the packet is currently queued, and performs the second class update when the packet reaches the head of the queue 114 to which the packet is moved according to the first update action, in an embodiment.

In an embodiment, when a PPEs 104 complete processing of a packet, the PPE 104 sends an instruction to the ordering unit 106 indicating to the ordering unit 106 that processing of the packet has been completed. When the controller 110 of the ordering unit 106 receives an instruction from a PPE 104 indicating that processing of a packet has been completed by the PPE 104, the controller 110 waits until the packet reaches the head of the queue 114 in which the packet is queued, and then causes the packet to be sent to an appropriate target port 112 for transmission of the packet via the port 112. Because the controller 110 performs an action with respect to a packet (i.e., updating a class for a packet, sending a packet to a target port for transmission of the packet, dropping a packet etc.) when the packet is at the head of the queue 114 in which the packet is currently queued in the ordering unit 106, the controller 110 ensures that packet order is maintained within the queue 114, as will be explained in more detail below, in various embodiments and/or scenarios.

Additionally, in some embodiments, the ordering unit 106 is configured to provide various information to the PPEs 104, such as information regarding state of the queues 114 and/or information regarding state of the instructions received from the PPEs 104. In some embodiments, the ordering unit 106 is configured to send some packets received by the ordering unit 106 to the PPEs 104 without assigning packet IDs to the packets and/or without enqueuing the packets in the ordering unit 106.

In some embodiments, multiple PPEs 104 perform various processing operations with respect to a packet. For example, the PPEs 104 perform contexts switching when processing a packet, and processing of a packet is transferred from one PPE 104 to another PPE 104 by transferring a packet context associated with the packet from one PPE 104 to the other PPE 104, in an embodiment. For ease of explanation, in embodiments described below, generally a single PPE 104 performs processing to completion of a packet. It is to be understood, however, that multiple PPEs 104 perform processing operations with respect to a packet, in some embodiments.

Figure 2:
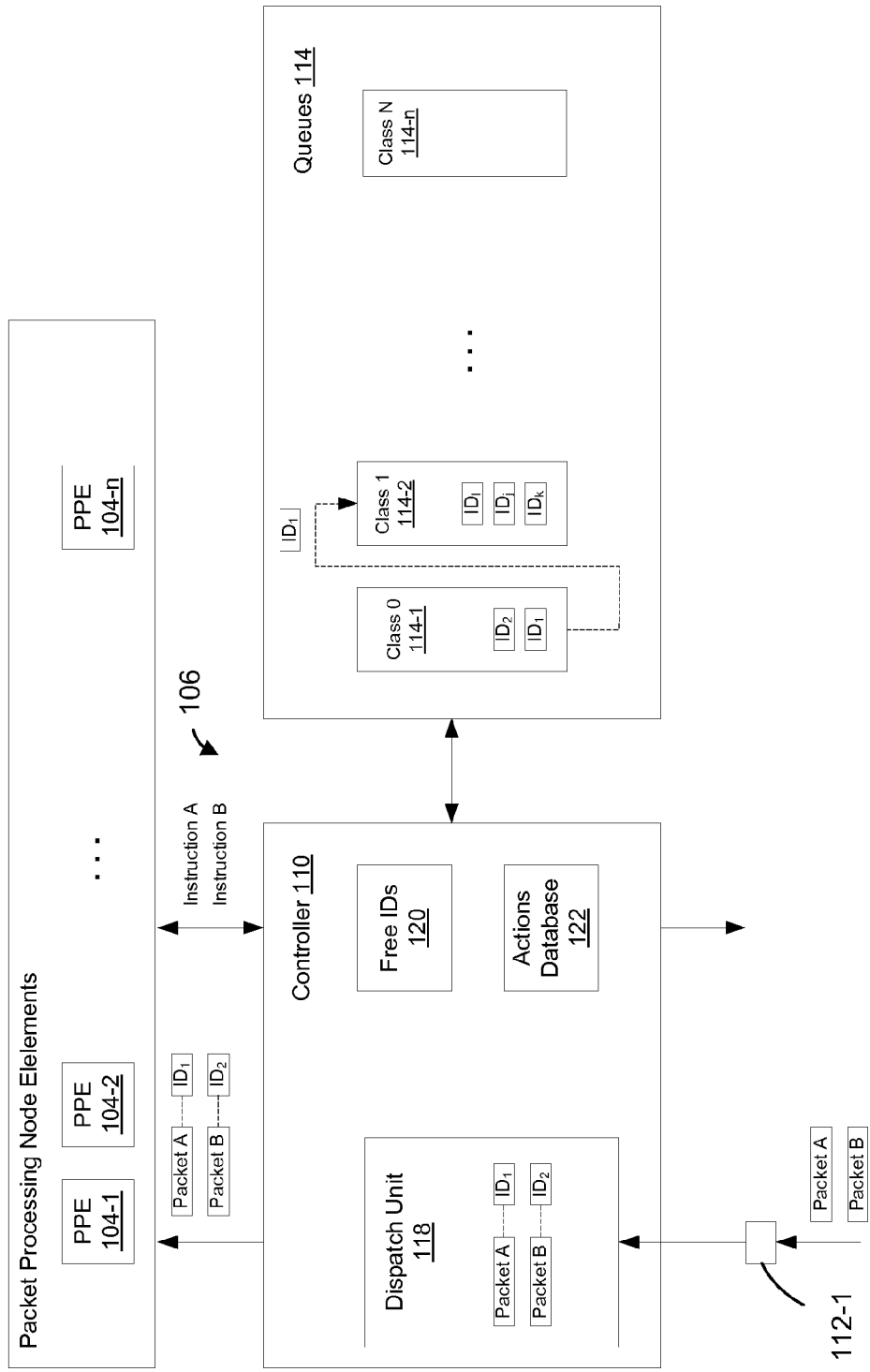
FIG. 2 is a diagram of an example ordering unit, according to an embodiment.

FIG. 2 illustrates the ordering unit 106 of FIG. 1 in more detail, according to an embodiment. In the embodiment of FIG. 2, the controller 110 includes a dispatch unit 118 configured to assign respective packet IDs to packets received by the ordering unit 106, and to send the packets to the PPEs 104 for processing of the packets by the PPEs 104. The controller 110 includes or is coupled to a free IDs unit 120 and an actions database 122. The dispatch unit 118 uses free IDs contained in, or generated by, the free IDs unit 120 to assign packet IDs to packets prior to sending the packets to PPEs 104 for processing of the packets by the PPEs 104. In an embodiment, the free IDs unit 120 includes a queue of free IDs such as a FIFO or a linked list queue of free IDs. In another embodiment, the free IDs unit 120 includes another suitable record (e.g., a table or a database) of free IDs and/or includes an ID generator. In an embodiment, the dispatch unit 118 suitably associates each packet and the packet ID assigned to the packet, and sends the packet along with the packet ID to a PPE 104. The PPE 104 uses the packet ID associated with the packet to communicate with the ordering unit 106, for example to send instructions, to the controller 110, indicative of actions to be taken with respect to the packet by the controller 110.

In an embodiment, the controller 110 is configured to enqueue the packet IDs assigned to the packets in the queues 114 according to an order in which the packets were received by the network device 100. In the embodiment illustrated in FIG. 2, the network device 100 receives a packet A and a packet B via the port 112-1. As illustrated in FIG. 2, the packet A enters the network device 100 at an earlier time relative to the time at which the packet B enters the network device 100. The ordering unit 106 receives the packet A, assigns a packet ID1 to the packet A, and sends the packet A along with the packet ID1 assigned to the packet A to a first PPE 104 (e.g., the PPE 104-1) for processing of the packet. Also, the ordering unit 106 enqueues the packet ID1 assigned to the packet A in a default queue 114-1 corresponding to the source port 112-1 via which the packet A was received by the network device 100. Similarly, the ordering unit 106 receives the packet B, assigns a packet ID2 to the packet B, and sends the packet B along the packet ID2 assigned to the packet B to a second PPE 104 (e.g., the PPE 104-2) for processing of the packet B by the second PPE 104. Because the packet A and the packet B are both received by the network device 100 via the port 112-1 and, therefore, the packet A and the packet B are associated with the same port 112-1, the packet A and the packet B are queued in the same default queue 114-1, in an embodiment. Further, because packet A entered the network device 100 before packet B entered the network device 100, packet A is queued in the queue 114-1 ahead of the packet B, in an embodiment.

Subsequently, the controller 110 receives, from the PPE 104-1, an instruction A indicative of an action to be taken with respect to the packet A, and receives from the PPE 104-2, an instruction B indicative of an action to be taken with respect to the packet B. As illustrated in FIG. 2, the controller 110 receives the instruction B before receiving the instruction A, in the illustrated embodiment and scenario. The controller 110 checks whether the ID2 associated with the packet B is at the head of the queue 114-1. Because the ID2 is not at the head of the queue 114-1, the controller 110 does not take the action indicated by the instruction B. Rather, the controller 110 associates the action indicated by instruction B with the packet B, for example by storing an association between the action indicated by the instruction B and the ID2 associated with the packet B in the actions database 122. Then, the controller 110 receives the instruction A indicating the action to be taken with respect to the packet A, and checks whether the ID1 associated with the packet A is at the head of the queue 114-1. Because the ID1 is at the head of the queue 114-1, the controller 110 performs the action indicated by the instruction A. In the embodiment of FIG. 2, the instruction A indicates an update to the packet class for the packet A. In particular, the instruction A indicates that the packet A belongs to the packet class 1, in an example embodiment. Alternatively, in another embodiment, the instruction A is issued by the PPE 104-1 prior to a class having been assigned to the packet A by the PPE 104-1. In this case, the instruction A indicates that the packet A should be moved to a new class without indicating the specific new class. In this case, the controller 110 determines a new packet class for the packet A in any suitable manner, for example by incrementing the current class corresponding to the packet A (e.g., incrementing class 0 to class 1), and moves the packet ID1 to the determined new class for the packet A by removing the ID1 from the head of the queue 114-1 corresponding to the packet class 0 and adding the packet ID1 to the tail of the queue 114-2 corresponding to the packet class 1.

As another example, when the instruction A indicates that processing of the packet A is completed and the packet A is ready to be forwarded to a target port 112 for transmission of the packet A via the target port 112, the controller 110 causes the packet A to be sent for transmission to the target port 112, removes the packet ID1 from the queue 114-1, and releases the packet ID1 for example by returning the packet ID1 to the pool of free IDs 120, in an embodiment. As yet another example, the instruction A indicates that the packet A should be dropped, the controller 110 removes the ID1 from the queue 114-1 and returns the ID1 to the pool of free IDs 120, in an embodiment.

After the action is performed with respect to the packet A, the packet ID2 corresponding to the packet B moves to the head of the queue 114-1. The controller 110 checks whether an instruction indicating an action to be taken with respect to packet B has been received by the controller 110. For example, the controller 110 queries the actions database 122 for an action associated with the ID2 corresponding to the packet B. If an action associated with the ID2 is found in the actions database 122, then the controller 110 performs the action with respect to the packet B.

In some embodiments, the controller 110 is configured to, after performing an action, inform the PPE 104 that issued the instruction indicating the action that the action has been performed by the controller 110. The PPE 104 is configured to, after issuing an instruction indicating an action to be taken with respect to a packet, wait until receiving an acknowledgement indicating that the action has been performed by the controller 110 before performing certain other actions with respect to the packet. For example, the PPE 104 waits until receiving the acknowledgment before accessing a stateful data structure to obtain information corresponding to the packet. As such the ordering unit 106 serves to maintain a correct order for accessing the stateful structure such that the correct information corresponding to the packet is retrieved from the stateful structure, in an embodiment. As another example, the PPE 104 waits until receiving the acknowledgment before issuing another instruction corresponding to the packet to the ordering unit 106, in an embodiment. In an embodiment, the PPE 104 performs other processing operations (e.g., other processing operations with respect to the packet) while waiting to receive the acknowledgment from the ordering unit 106. The PPE 104 then checks whether the acknowledgment has been received before performing an operation for which the acknowledgement is needed, such as accessing a stateful data structure with respect to the packet, or issuing another instruction to the ordering unit 106 with respect the packet, in an embodiment.

In an embodiment, the ordering unit 106 is configured to, when a packet reaches the head of a queue 114, to provide a notification to the PPE 104 that is processing the packet to notify the PPE 104 that the packet has reached the head of the queue 114. The PPE 104 is configured to wait until such notification for a packet is received from the ordering unit 106 before performing certain operations on the packet, such as accessing a centralized resource (e.g., stateful data structure) accessible by multiple ones of the PPEs 104 for performing the certain operation with respect to the packet. Then, after the operation has been completed for the packet, the PPE 104 sends an update to the ordering unit 106 indicating a class update for the packet, in an embodiment. The ordering unit 106 receives the class update and moves the packet from the head of the queue 114 in which the packet is currently queued to a new queue 114 corresponding to the new class indicated by the class update, allowing the next packet in the queue 114 in which the packet was queued to move to the head of the queue 114. Then, the ordering unit 106 sends a notification the PPE 104 that is processing the next packet in the queue 114 that notifying the PPE 104 that the next packet is now at the head of the queue 114 and allowing the PPE 104 that is processing the next packet to perform a certain operation with respect to the next packet, such as accessing the centralized resource for performing the certain operating with respect to the next packet.

Additionally or alternatively, the ordering unit 106 allows the processors 104 to poll the ordering unit 106 to obtain a list of packets that are currently at heads of the respective queues 114 in which the packets are currently queued in the ordering unit 106. In an example embodiment and scenario, a PPE 104 receives the list of packets that are currently at the heads of the queues 114 and determines whether a certain packet being processed by the PPE 104 is currently at the head of the queue 114. If so, then the PPE 104 performs the action (e.g., accesses a stateful data structure to obtain data corresponding to the packet). On the other hand, if the packet is currently not at the head of the queue 114 in which the packet is queued in the ordering unit 106 (e.g., the packet is not indicated as one of the packets in the list of packets that are at the heads of the queues 114), then the PPE 104 does not perform the action, and waits until the packet moves to the head of the queue 114 to perform the action. For example, the PPE 104 continues polling the ordering unit 106 until the list of packet that are currently at heads of the respective queues 114, obtained from the ordering unit 106, indicates that the packet is now at the head of the queue 114, in an embodiment.

Figure 3:
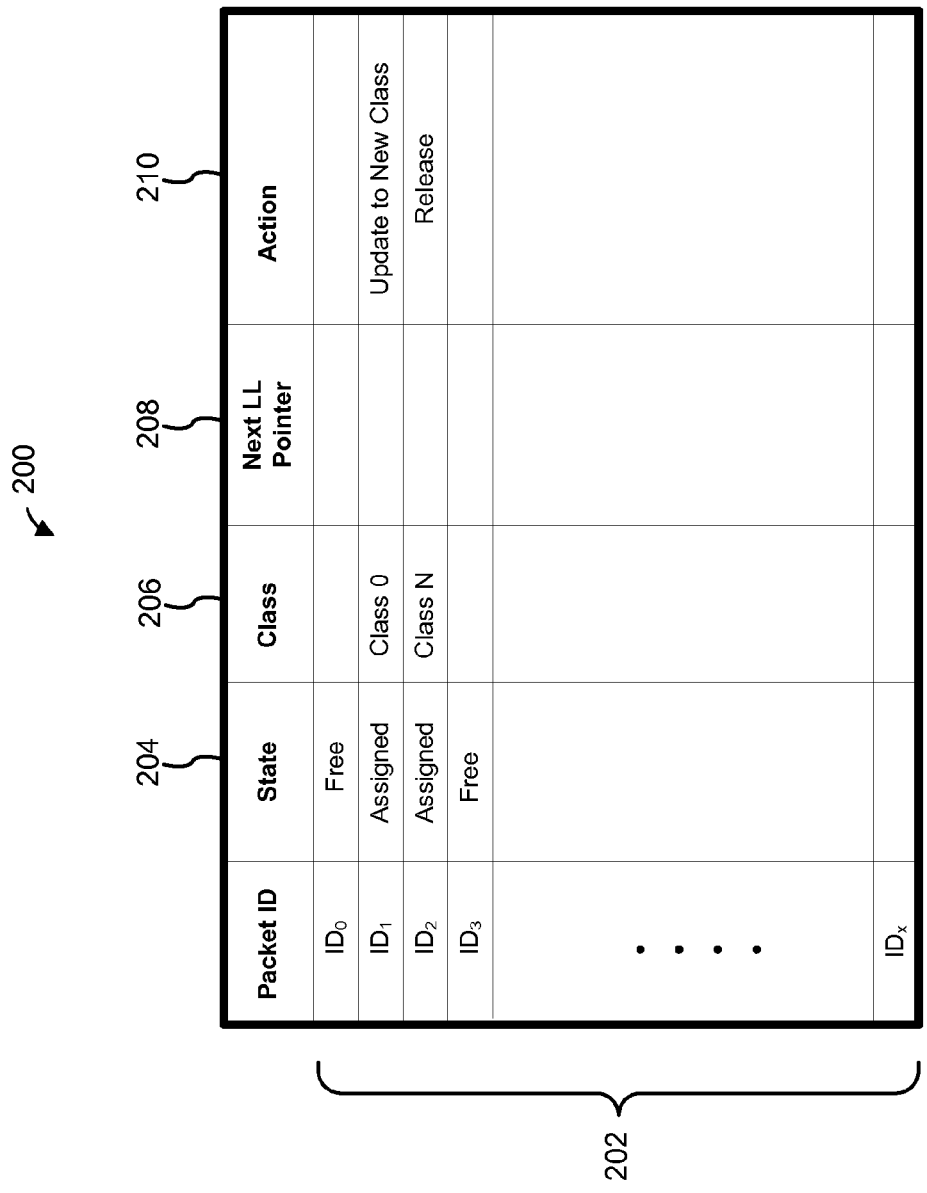
FIG. 3 is an example actions table/database used by an ordering unit to store actions to be taken with respect to packets, according to an embodiment.

FIG. 3 is an example actions table or database 200 used by an ordering unit, such as the ordering unit 106 of FIG. 2, according to an embodiment. The table/database 200 is generally configured to store associations between actions and packets with respect to which the actions are to be taken by the ordering unit, and stores additional information associated with the packets and/or the queues used for queuing the packets, in some embodiments. In an embodiment, the table/database 200 is stored in a memory (e.g., random access memory or other suitable memory) included in or coupled to the controller 110 of FIG. 2. In an embodiment, the table/database 200 corresponds to the actions database 122 of FIG. 2. In another embodiment, the table/database 200 is used by other suitable components of the of the network device 100 or by network devices other than the network device 100. For ease of explanation, the table/database 200 is described below with reference to the network device 100 of FIG. 1.

The table/database 200 includes a plurality of entries 202. Each entry 202 is associated with a respective packet ID and is used to store various data or information corresponding to the packet ID. In the example embodiment of FIG. 2, each row 202 includes a status field 204 for indicating whether the packet ID is currently associated with a packet being processed by the network device 100 or is currently free and, accordingly, is available for assignment to new packets entering the network device 100. For those packet IDs that are currently associated with packets being processed by the network device 100, a class field 206 in the table 200 stores an indication of class (e.g., a default class or a non-default class) currently associated with the packet ID. A next LL pointer field 208 includes a pointer or another indication of a memory address at which the next packet in the queue corresponding to the class indicated in the class field 204. Additionally, each entry 202 of the table/database 200 includes an action field 210 used to store actions to be taken with respect to the packets when the packets reach the heads of the respective queues 114 in which the packets are queued in the ordering unit 106.

In an embodiment, the controller 110 is configured to store at least the actions to be taken with respect to packets that are not at heads of queues 114 in which the packets are queued when instructions indicating the actions are received by the controller 110. The controller 110 is configured to store the actions in the actions fields 210 of the appropriate entries 200 associated with the packet IDs corresponding to the packets, in an embodiment. The controller 110 is configured to query the table/database 200 to determine whether a packet newly arrived to the heads of the queues 114 has an associated action stored in the table/database 200. If such an action corresponding to a particular packet (which is at the head of the queue 114 in which the packet is queued) is found in the table/database 200, the action is taken with respect to the particular packet, in an embodiment. If no such action is found, then the packet remains at the head of the queue 114 until an instruction indicating an action to be take with respect to the particular packet is received from the PPEs 104, in an embodiment.

In some embodiments, the table/database 200 omits at least some of the fields 204-210 illustrated in FIG. 3 and/or includes other fields not illustrated in FIG. 3. For example, each entry 202 of the table/database 200 includes a descriptor database field for storing a packet descriptor corresponding to the packet ID associated with the entry 202, in an embodiment. The controller 110 is configured to receive, form a PPE 104, a packet descriptor associated with a packet along with an instruction indicating that processing of the packet has been completed by the PPE 104, in an embodiment. The controller 110 is configured to store the packet descriptor in the packet descriptor field of the entry 202 associated with the packet ID corresponding to the packet, and to send the packet descriptor to an appropriate target port 112 when the packet ID corresponding to the packet is at the head of the queue 114 in which the packet is queued, in an embodiment.

Figure 4:
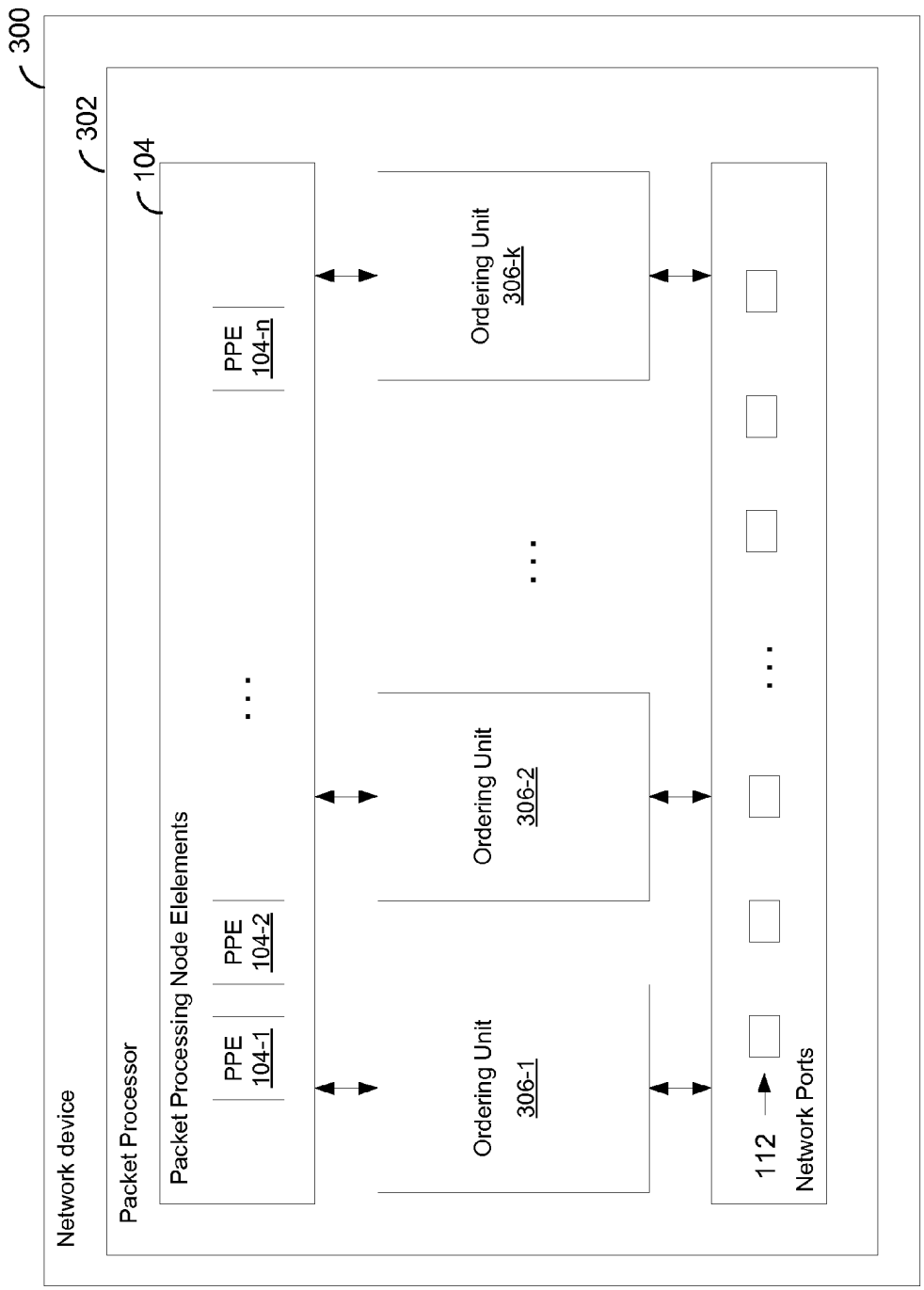
FIG. 4 is a block diagram of another example network device, according to another embodiment.

FIG. 4 is a block diagram of a network device 300, according to another embodiment. The network device 300 is similar to the network device 100 of FIG. 1 except that the network device 300 includes a plurality of ordering units 306-1 to 306-k, wherein each of the ordering units 306-1 to 306-k operates on packets received via respective subsets of source ports 112 with each of the subsets including one or more of the source ports 112. In this embodiment, each of the ordering units 106 is responsible for maintaining order of packets (e.g., packets belonging to a same data flow or a same class of packets) received via the one or several of the source ports 112. In an embodiment, each of the ordering units 306-1 to 306-k is the same as or similar to the ordering unit 106 of FIG. 1. In an embodiment, each of the ordering units 306-1 to 306-k operates on a plurality of class queues including one or several default class queues. Each of the ordering units 306-1 to 306-k is configured to enqueue packets received by the network device 100 via a source port (or ports) 112 in respective queues corresponding to respective packet classes and according to the order in which the packets were received by the network device 300, to communicate with the PPEs 104 to receive instructions indicating actions to be taken with respect to the packets, and to perform the actions when the packets are at the heads of the queues in which the packets are queued, thereby maintaining the order of packets.

Generally speaking, data flows for which order needs to be maintained in a network device such as the network device 300 share at least a common source port 112. Thus, the network device 300 can include any suitable number of ordering units 306, such as a number of ordering units 306 needed or desired to support a particular bandwidth of the network device 300. Accordingly, packet ordering operations in the network device 300 can be easily scaled to support larger bandwidths in the network device 300 for example by adding additional ordering units 306 such that each ordering unit 306 is responsible for maintaining order of packets received via fewer of the source ports 112 allowing the ordering units 306 to more quickly perform various processing operations, in at least some embodiments.

Figure 5:
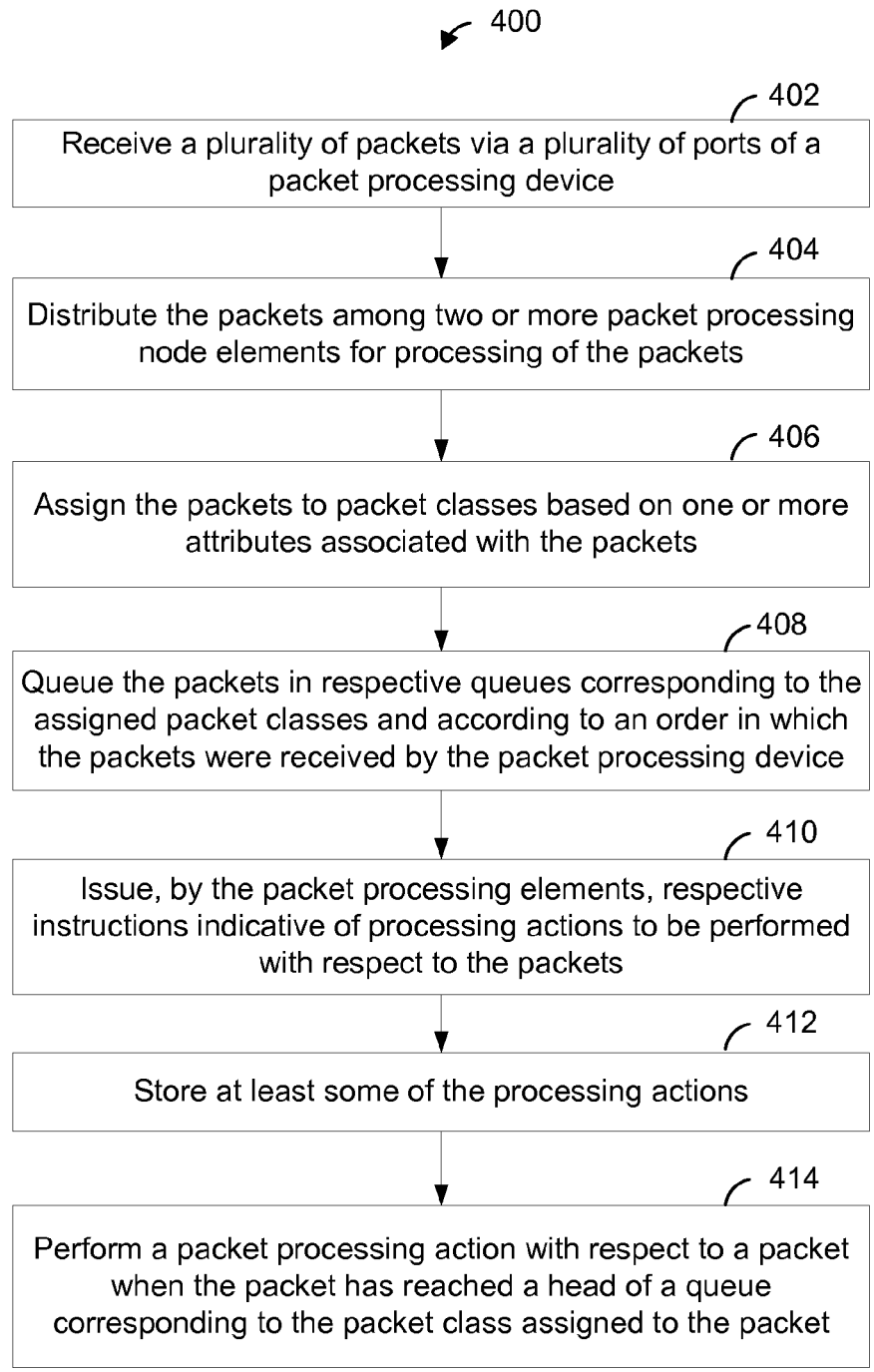
FIG. 5 is a flow diagram of an example method for preserving an order of packets in a network device, according to an embodiment.

FIG. 5 is a flow diagram of an example method 400 for preserving an order of packets in a packet processing device, according to an embodiment. The method 400 is implemented by the network device 100 of FIG. 1, in an embodiment. The method 400 is implemented by the network device 300 of FIG. 4, in another embodiment. In other embodiments, the method 400 is implemented by other suitable network devices.

At block 402, a plurality of packets are received via a plurality of ports of the packet processing device. At block 404, the packets are distributed to two or more packet processing elements for processing of the packets by the packet processing elements. In an embodiment, the packets received at block 402 are provided to an ordering unit, and the ordering unit distributes the packet to the two or more packet processing elements at block 404.

At block 406 the packets are assigned to respective packet classes. In an embodiment, an ordering unit that receives a packet initially assigns the packet to a default packet class (e.g., packet class 0) and then distributes the packet to a packet processing element for processing of the packet by the packet processing element. In an embodiment, the packet processing element then determines a packet class corresponding to the packet during processing of the packet. In an embodiment, a packet class is determined for a packet based on one or more attributes associated with the packet, such as one or more parameters included in the packet or otherwise associated with the packet. In an embodiment, after determining the packet class corresponding to the packet, the packet processing element informs the ordering unit of the packet class determined for the packet by the packet processing element. In another embodiment, the packet processing element does not assign a packet class to a packet class. In this case, the packet remains assigned to the default packet class assigned to the packet by the ordering unit, in an embodiment.

At block 408, the packets are queued in respective queues corresponding to the packet classes assigned to the packets. In an embodiment, packets in each queue are queued according to an order in which the packets were received by the packet processing device. In an embodiment, the packets are initially queued in one or more respective default class queues (e.g., packet class 0), and at least some of the packets are moved to particular classes to which the packets correspond after the particular classes have been determined for the packets. In another embodiment, at least some of the packets are moved to new classes before particular classes to which the packets correspond have been determined for the packets, for example when it takes a relatively long time to determine the particular class to which the packet corresponds. In this embodiment, the packet is moved to a tail of a queue corresponding to any one of the classes, thereby unblocking other packets queued in the queue in which the packet was originally queued. For example, the packet is moved to a queue corresponding to the current class of the packet incremented by one (e.g., from packet class 0 to packet class 1 or from packet class 1 to packet class 2, etc.), in an embodiment. The packet class for the packet is updated at a later time, when the particular packet class corresponding to the packet has been determined, in some embodiments and scenarios.

At block 410, respective instructions indicative of actions, such as updating a class for a packet, forwarding a packet, dropping a packet, etc., to be performed with respect to the packets are issued by the packet processing elements. At block 412, at least some of the actions are in a suitable manner associated with the packets to which the actions correspond. For example, associations between the actions and the packets to which the actions correspond are stored in a memory. In an embodiment, actions are stored at block 412 if the packets to which the actions correspond are not at heads of their respective queues. In another embodiment, actions are stored at block 412 even if the packets to which the actions correspond are at the heads of their respective queues.

At block 414, a processing action is performed with respect to a packet. In an embodiment, the processing action is performed at block 414 if the corresponding packet is at the head of the queue in which the packet is queued. Because actions are performed with respect to packets at the heads of their respective queues, order of the packets in maintained within the queues, in an embodiment.

Figure 6:
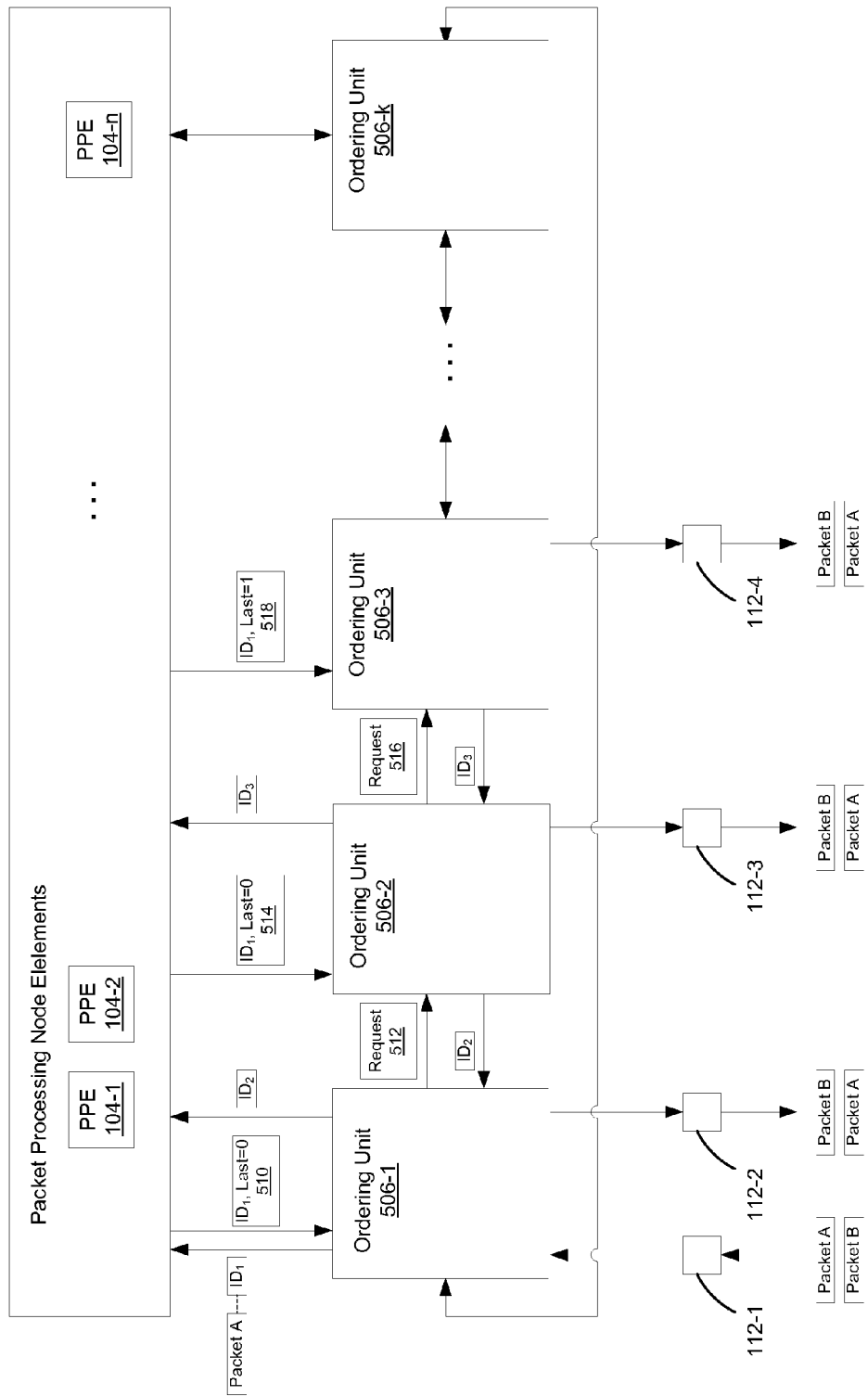
FIG. 6 is a block diagram of another example network device, according to yet another embodiment.

FIG. 6 is a block diagram of an example network device 500, according to an embodiment. The network device 500 is generally similar to the network device 100 of FIG. 1 and the network device 300 of FIG. 4, and includes like-numbered elements with the network device 100 of FIG. 1 and the network device 300 of FIG. 4 that will not be described again in detail for sake of brevity.

The network device 500 is configured to process one or more multicast data flows, and to maintain order of multicast packets in respective multicast data flows such order of packets in which the multicast packets are transmitted from the network device 500 is the same as the order in which the multicast packet were received by the network device 500. In an embodiment, a multicast data flow is associated with a group of target devices, and the network device 500 is configured to forward packets that belong to the multicast data flow to each one of the target devices. In some embodiments, the network device 500 transmits multiple data streams corresponding to a single multicast data flow, for example when respective data streams are to be transmitted to respective target devices or respective sub-groups of target devices via different ones of the ports 112. In this case, the network device 500 replicates packets in the multicast data flow and transmits respective instances of packets in respective data streams via the different ones of the ports 112, in embodiment.

In an embodiment, the network device 500 includes a plurality of ordering units 506. Each ordering unit 506 is generally the same as or similar to the ordering unit 106 of FIG. 1, in an embodiment. Each ordering unit 506 is configured to process unicast packets as well as multicast packets, in an embodiment. Each ordering unit 506 generally handles multicast packets using techniques described above with respect to FIGS. 1-5, in an embodiment. For example, each packet order unit 506 is configured to enqueue a multicast packet in one or more default queues 114 in the order unit 506, to receive one or more instructions that indicate actions to be performed with respect to the multicast packet, to store at least some of the instructions, and to perform the an indicated actions with respect to the multicast packet when the multicast packet is at a head of a queue in the ordering unit 506, in various embodiments and/or scenarios.

In an embodiment, when multiple data streams corresponding to a multicast data flow are to be transmitted by the network device 500, different ones of the ordering units 506 maintain order of packets within the different data streams transmitted by the network device 500. Distributing multiple data streams among multiple ordering units 506 allows the multiple data streams to be transmitted from the network device 500 at a higher rate compared to systems in which a single ordering unit is used to maintain order for all data streams corresponding to a multicast data flow, in at least some embodiments. Generally speaking, if each of the ordering units 506 has a processing bandwidth of X and, accordingly, is capable of transmitting packets at a rate X, then k of such ordering units transmit multiple data streams at a rate k*X, in an embodiment. In an embodiment, the number k of ordering units 506 is selected such that k*X is high enough to support a line rate, or the full wire speed, supported by the network device 500.

According to an embodiment, when a first instance of a multicast packet is forwarded by a first ordering unit 506 to a port 112 for transmission of the first instance of the packet via the port 112, a second instance of the packet is enqueued in a second ordering unit 506 and is subsequently forwarded by the second ordering unit 506 to a port 112 for transmission of the second instance of the packet via second port 112. In an embodiment, the ordering units 506 are arranged in a circular chain of ordering units 506, with each ordering unit 506 configured to receive packets from the preceding ordering unit 506 in the chain of ordering units 506, and to relay packets to the following ordering unit 506 in the chain of ordering units 506. In operation, when an ordering unit 506 forwards an instance of a multicast packet to a port 112, the ordering unit 506 checks whether an additional instance of the packet is still to be transmitted by the network device 500. For example, the ordering unit 506 receives an instruction from a PPE 104 indicating that processing of the packet has been completed by the PPE 104, in an embodiment. In an embodiment, the instruction also includes an indication of whether or not the current instance of the packet (i.e., the instance of the packet that is queued in the ordering unit 506) is the last instance of the packet to be transmitted by the network device 500. If an additional instance of the packet is still to be transmitted by the network device 500, for example if the instruction indicates that the current instance of the packet A is not the last instance of the packet to be transmitted by the network device 500, then the ordering unit 506 relays the packet to the following ordering unit 506 in the chain of ordering units 506, and the packet is enqueued in the following ordering unit 506 for subsequent transmission of the second instance of the packet via a port 112, and so on, until no more instances of the multicast packet remain to be transmitted by the network device 500. As a result, a particular ordering unit 506 in the chain of ordering units 506 maintains order of instances of multicast packets in a particular data stream of the multicast packets transmitted by the network device 500, in this embodiment.

In the example scenario illustrated in FIG. 6, the network device 500 receives a packet A and a packet B via a port 112-1. The packet A and the packet B are multicast packets that belong to a multicast data flow, in an embodiment. As illustrated in FIG. 6, the packet A enters the network device 500 before the packet B enters the network device 500. In an embodiment, the network device 500 provides the packet A and the packet B to the ordering unit 506-1. For example, the ordering unit 506-1 is configured to handle packets that enter the network device 500 via a group of one or more source ports that include the port 112-1, in an embodiment. In an embodiment, the ordering unit 506-1 receives the packet A, assigns a packet ID1 to the packet A, enqueues the packet ID1 in a queue in the ordering unit 506-1, and sends the packet A to a PPE 104 (e.g., the PPE 104-1), along with the packet ID1 assigned to the packet A, for processing of the packet A by the PPE 104. In an embodiment, the ordering unit 506-1 maintains a pool of non-sequential free IDs local to the ordering unit 506-1. In this embodiment, the ordering unit 506-1 assigns the packet ID1 to the packet A from the pool of non-sequential free IDs local to the ordering unit 506-1. The PPE 104-1 uses the packet ID1 to communicate with the ordering unit 506-1 to instruct the ordering unit 104 to take action or actions with respect to the packet A, for example to perform one or more packet class updates the packet class corresponding to the packet A, in some embodiments.

Similarly, the ordering unit 506-1 receives the packet B, assigns a packet ID to the packet B (e.g., from the pool of free packet IDs maintained by the ordering unit 506-1), euqueues the packet ID assigned to the packet B in the ordering unit 506-1, and sends the packet B, along with the packet ID assigned to the packet B, to a PPE 104-2 for processing of the packet B by the PPE 104-2, in an embodiment. The packet A and the packet B are received by the ordering unit 506-1 in the order in which the packets were received by the network device 500, in an embodiment. Because the packet B is received by the ordering unit 506-1 at a later time relative to the packet A being received by the ordering unit 506-1, packet B is queued behind packet A, in an embodiment.

During processing of the packet A, the PPE 104-1 determines that the packet A is a multicast packet, and that multiple instances of the packet A are to be transmitted from the network device 500. In response to determining that multiple instances of the packet A are to be transmitted, the PPE 104-1 generates the multiple instances of the packet A to be transmitted by the network device 500. When the PPE 104-1 completes processing of a first instance of the packet A, the PPE 104-1 sends an instruction 510 to the ordering unit 506-1. The instruction 510 includes the packet ID1 assigned to the packet A by the ordering unit 506-1 and an indication that processing of the current instance of the packet A queued in the ordering unit 506-1 has been completed by the PPE 104-1, in an embodiment. The instruction 510 also includes an indication of whether or not the current instance of the packet A queued in the ordering unit 506-1 is the last instance of the packet A to be transmitted by the network device 500, in an embodiment. For example, the instruction 510 includes a one-bit "last instance" indication, where a "last instance" bit is (i) set to a logic zero to indicate that the current instance of the packet A is not the last instance of the packet A to be transmitted or (ii) set to a logic one to indicate that the current instance of the packet A is the last instance of the packet A to be transmitted by the network device 500, or vice-versa, in an embodiment.

In the scenario of FIG. 6, the instruction 510 indicates that the current instance of the packet A queued in the ordering unit 506-1 is to be forwarded to the port 112-2. The instruction 510 also indicates that the current instance of the packet A is not the last instance of the packet A to be transmitted by the network device 500 (as indicated by "Last=0" in the instruction 510 in FIG. 6). In response to receiving the instruction 510 and when the packet ID1 is at a head of a queue in the ordering unit 506-1, the ordering unit 506-1 forwards the packet A to the port 112-2 for transmission of the second instance of the packet A via the port 112-2, and returns the packet ID1 to the pool of free packet IDs maintained by the ordering unit 506-1, in an embodiment. Upon forwarding the packet A to the port 112-2, the ordering unit 506-1 causes the packet A to be enqueued in the ordering unit 506-2, coupled to the ordering unit 506-1, for subsequent transmission of a second instance of the packet A via the port 112-2, in an embodiment. For example, upon forwarding the packet A to the port 112-2, the ordering unit 506-1 sends a request 512 to the ordering unit 506-2 requesting that the ordering unit 506-2 assign, to the packet A, a packet ID local to the ordering unit 506-2, in an embodiment. The ordering unit 506-2 receives the request 512 and, in response to receiving the request 512, assigns a packet ID2 to the packet A and enqueues the packet ID2 in a queue in the ordering unit 506-2. In an embodiment, the ordering unit 506-2 maintains a pool of non-sequential free IDs local to the ordering unit 506-2. In this embodiment, the ordering unit 506-2 assigns the packet ID2 to the packet A from the pool of non-sequential free IDs local to the ordering unit 506-2. In an embodiment, the ordering unit 506-2 provides the packet ID2 to the ordering unit 506-1. The ordering unit 506-1 receives the packet ID2 assigned to the packet A by the ordering unit 506-2 and provides the packet ID2 associated with the packet A to the PPE 104-1, in an embodiment. In an embodiment, the ordering unit 506-1 also provides to the PPE 104-1 an identifier associated with the ordering unit 506-2, such as an ordering unit identification (ID) number associated with the ordering unit 506-2, to the PPE 104-1. The PPE 104-1 uses the packet ID2 assigned to the packet A by the ordering unit 506-2, and the identifier associated with the ordering unit 506-2, to communicate with the ordering unit 506-2 to instruct the ordering unit 506-2 to take certain action or actions with respect to the packet A, for example to perform one or more packet class updates corresponding to the packet A in the ordering unit 506-2, in some embodiments. When the PPE 104-1 completes processing of the second instance of the packet A, the PPE 104-1 sends an instruction 514 to the ordering unit 506-2, in an embodiment. The instruction 514 is generally the same as or similar to the instruction 512, in an embodiment. The instruction 514 includes the packet ID2 assigned to the packet A by the ordering unit 506-2 and an indication that processing of the current instance of the packet A queued in the ordering unit 506-2 has been completed by the PPE 104-1, in an embodiment. The instruction 514 also includes an indication (e.g., a single-bit "last instance" indication) of whether or not the current instance of the packet A queued in the ordering unit 506-2 is the last instance of the packet A to be transmitted by the network device 500, in an embodiment.

In the embodiment of FIG. 6, the instruction 514 indicates that the current instance of the packet A queued in the ordering unit 506-2 is to be forwarded to the port 112-3. The instruction 514 also indicates that the current instance of the packet A is not the last instance of the packet A to be transmitted by the network device 500 (as indicated by "Last=0" in the instruction 514 in FIG. 6). In response to receiving the instruction 514 and when the packet ID3 is at a head of a queue in the ordering unit 506-2, the ordering unit 506-2 forwards the packet A to the port 112-3 for transmission of the second instance of the packet A via the port 112-3, and returns the packet ID2 to the pool of free packet IDs maintained by the ordering unit 506-2, in an embodiment. Upon forwarding the packet A to the port 112-3, the ordering unit 506-2 causes the packet A to be enqueued in the ordering unit 506-3, coupled to the ordering unit 506-2, for subsequent transmission of a third instance of the packet A via a third port 112 (e.g., the port 112-4), in an embodiment. For example, upon forwarding the packet A to the port 112-3, the ordering unit 506-2 sends a request 516 to the ordering unit 506-3 requesting that the ordering unit 506-3 assign, to the packet A, a packet ID local to the ordering unit 506-3, in an embodiment. The ordering unit 506-3 receives the request 516 and, in response to receiving the request 516, assigns a packet ID3 to the packet A and enqueues the packet ID2 in a queue in the ordering unit 506-3. In an embodiment, the ordering unit 506-3 maintains a pool of non-sequential free IDs local to the ordering unit 506-3. In this embodiment, the ordering unit 506-3 assigns the packet ID3 to the packet A from the pool of non-sequential free IDs local to the ordering unit 506-3. In an embodiment, the ordering unit 506-3 provides the packet ID3 to the ordering unit 506-2. The ordering unit 506-2 receives the packet ID3 assigned to the packet A by the ordering unit 506-3 and provides the packet ID3 associated with the packet A to the PPE 104-1, in an embodiment. In an embodiment, the ordering unit 506-2 also provides to the PPE 104-1 an identifier associated with the ordering unit 506-3, such as an ordering unit identification (ID) number associated with the ordering unit 506-3, to the PPE 104-1.

The PPE 104-1 uses the packet ID3 assigned to the packet A by the ordering unit 506-3, and the identifier associated with the ordering unit 506-3, to communicate with the ordering unit 506-2 to instruct the ordering unit 506-3 to take certain action or actions with respect to the packet A, for example to perform one or more packet class updates corresponding to the packet A in the ordering unit 506-3, in some embodiments. In an embodiment, when the PPE 104-1 completes processing the third instance of the packet A, the PPE 104-1 sends an instruction 518 to the ordering unit 506-3. The instruction 518 includes the packet ID3 assigned to the packet A by the ordering unit 506-3 and an indication that processing of the current instance of the packet A queued in the ordering unit 506-3 has been completed by the PPE 104-1, in an embodiment. The instruction 518 also indicates that the current instance of the packet A queued in the ordering unit 506-3 is to be forwarded to the port 112-4, and further indicates that and that the current instance of the packet A is the last instance of the packet A to be transmitted by the network device 500 (as indicated by "Last=1" in the instruction 514 in FIG. 6), in an embodiment. In response to receiving the instruction 518 and when the ID3 is at a head of a queue in the ordering unit 506-3, the ordering unit 506-3 forwards the packet A to the port 112-4, and returns the packet ID3 to the pool of free packet IDs maintained by the ordering unit 506-3, in an embodiment. Because the third instance of the packet A is the last instance of the packet A to be transmitted by the network device 500, the ordering unit 506-3 does not request an additional packet ID to be assigned to the packet A by another ordering unit 506 coupled to the ordering unit 506-3, in an embodiment.

According to an embodiment, processing of the packet B proceeds in a manner similar to processing of the packet A. For example, the ordering unit 506-1 forwards the packet B to the port 112-2 when processing of the packet B has been completed by the PPE 104-2 and the packet B is at the head of a queue in the ordering unit 506-1, in an embodiment. Because the packet B was received by the network device 500 at a later time relative to the packet A being received by the network device 500, the ordering unit 506-1 forwards the packet B to the port 112-2 after forwarding the packet A to the port 112-2, thereby ensuring that the first instances of the packet A and the packet B are transmitted by the network device 500 in the order that the packet A and the packet b were received by the network device 500. Upon forwarding the packet B to the port 112-2, the ordering unit causes the packet B to be enqueued in the ordering unit 506-2, in an embodiment. For example, the ordering unit 506-1 sends a request to the ordering unit 506-2 to request a packet ID to be assigned to the packet B, and the ordering unit 506-2 enqueues a packet ID assigned to the packet B in the ordering unit 506-2.

The ordering unit 506-2 forwards the packet B to the port 112-3 when processing of the packet B has been completed by the PPE 104-2 and the packet B is at the head of a queue in the ordering unit 506-2, in an embodiment. Because the packet B is received by the network device 500 after the packet A being received by the network device 500, the packet B is queued in the ordering unit 506-2 behind the packet A, in an embodiment. As a result, the ordering unit 506-2 forwards the packet B to the port 112-3 behind the packet A such that the packet A is transmitted via the port 112-3 after the packet A is transmitted via the port 112-3, in this embodiment. Thus, the ordering unit 506-2 maintains the order among second instances of the packet A and the packet B so that the second instances of the packet A and the packet B are transmitted by the network device 500 in the order that the packet A and the packet B were received by the network device 500. Similarly, the ordering unit 506-3 maintains the order among third instances of the packet A and the packet B so that the third instances of the packet A and the packet B are transmitted by the network device in the order that the packet A and the packet B were received by the network device 500, in an embodiment.

Figure 7:
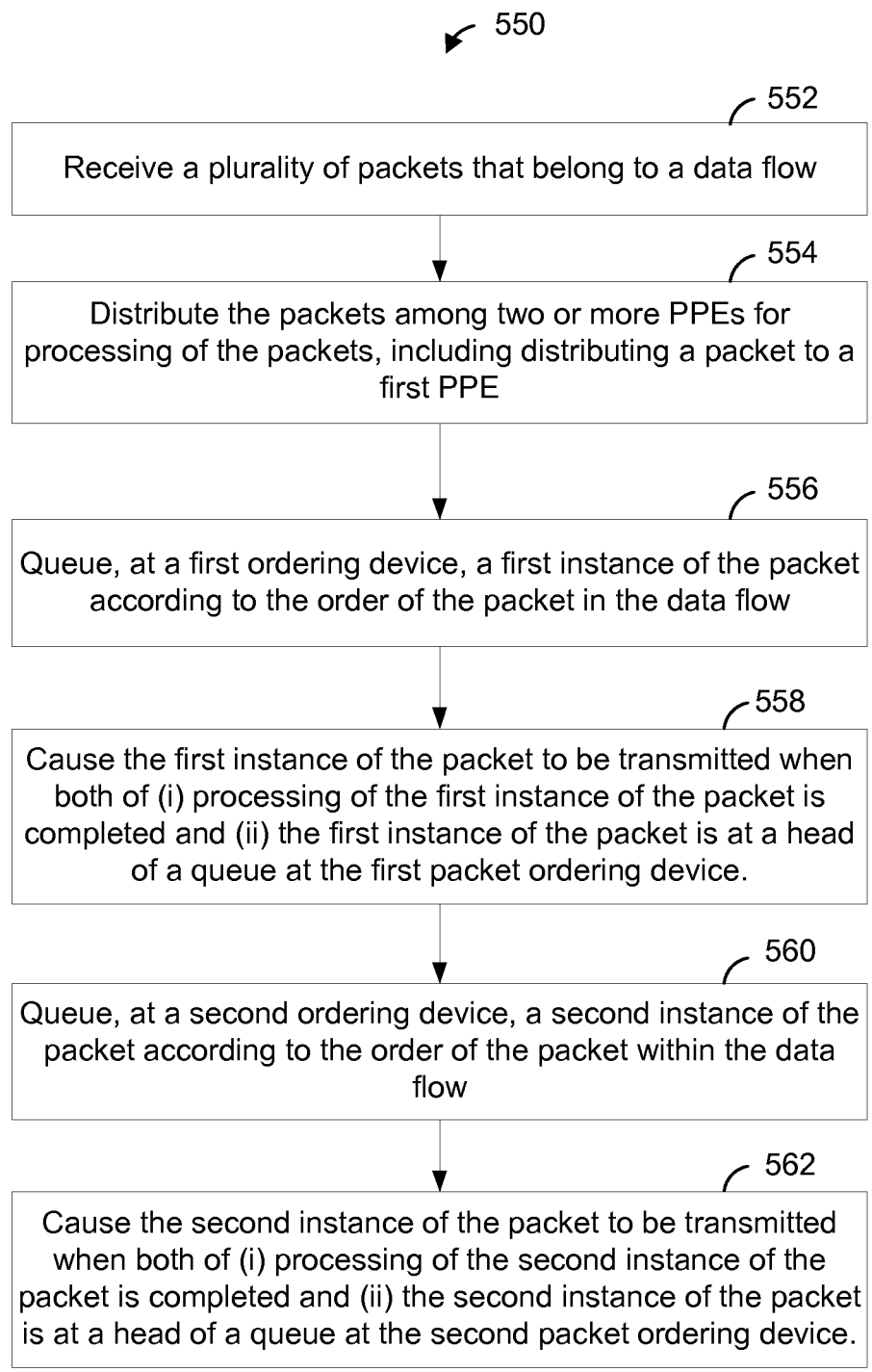
FIG. 7 is a flow diagram of an example method for preserving an order of packets in a packet processing device, according to an embodiment.

FIG. 7 is a flow diagram of an example method 550 for preserving an order of packets in a packet processing device, according to an embodiment. The method 550 is implemented by the network device 500 of FIG. 6, in an embodiment. In other embodiments, the method 550 is implemented by other suitable network devices. For ease of explanation, the method 550 is described below in connection to the network device 500 of FIG. 6.

At block 552, a plurality of packets are received at a port of a network device. The plurality of packets belong to a same multicast data flow, in an embodiment. At block 554, the packets received at block 552 are distributed among two or more packet processing elements. Block 554 includes distributing a packet to a first packet processing element, in an embodiment.

At block 556, the packet distributed to the first packet processing element at block 554 is queued in a first ordering device. For example, the packet is queued in the ordering unit 506-1 of the network device 500, in an embodiment. In another embodiment, the first instance of the packet is queued in another ordering unit 506 or is queued in another ordering device.

At block 558, the first ordering device causes the first instance of the packet to be transmitted. For example, the first ordering device (e.g, the ordering unit 506-1) forwards the packet to a first port (e.g., the port 112-2) of the network device for transmission of the packet via the first port of the network device, in an embodiment. The block 558 is performed when (i) processing of the first instance of the packet is completed and (ii) the first instance of the packet is at a head of a queue at the first ordering device.

At block 560, a second instance of the packet is queued at a second ordering device. For example, the second instance of the packet is queued at the ordering unit 506-2, in an embodiment. For example, the first ordering device (e.g., the ordering unit 506-1) causes the second instance of the packet to be queued at the second ordering device (e.g., the ordering unit 506-2), in an embodiment. In other embodiments, the second instance of the packet is queued at other suitable ordering devices.

At block 558, the second ordering device causes the second instance of the packet to be transmitted. For example, the second ordering device (e.g., the ordering unit 506-2) forwards the packet to a second port (e.g., the port 112-2) of the network device for transmission of the packet via the second port of the network device, in an embodiment. Block 558 is performed when (i) processing of the second instance of the packet is completed and (ii) the second instance of the packet is at a head of a queue at the second ordering device, in an embodiment. In an embodiment, the first port 112 and the second port 112 are different ones of the ports 112. In another embodiment, the first port 112 and the second port 112 are the same one of the port 112. In other words, the first instance of the packet and the second instance of the packet are transmitted via the same port 112, in this embodiment.

In an embodiment, the packet distributed to the first packet processing element at block 554 is a first packet of the plurality of packets, and the block 554 further includes distributing a second packet of the plurality of packets received at block 552 to a second packet processing element. In an embodiment, the second packet is received at block 552 at a later time relative to the first packet being received at block 552. Blocks 556-562 are further performed with respect to the second packet, in an embodiment. In an embodiment, blocks 556-568, performed by the first ordering device, ensure that first instances of the first packet and the second packet are transmitted by the network device in the order that the first packet were received by the network device (i.e., the first instance of the first packet is transmitted prior to the first instance of the second packet being transmitted). Further, blocks 560-562, performed by the second ordering device, ensure that second instances of the first packet and the second packet are transmitted by the network device in the order that the first packet were received by the network device (i.e., the second instance of the first packet is transmitted prior to the second instance of the second packet being transmitted). Accordingly, maintaining order of respective instances of packets that belong to the multicast data flow is distributed among the first ordering device and the second ordering device, in an embodiment.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing packets in a network device, the method comprising:
 receiving a plurality of packets at a port of the network device, wherein the plurality of packets belong to a data flow;
 distributing the packets among two or more parallel processing (PP) packet processing elements for processing of the packets, including distributing a packet of the plurality of packet to a first PP packet processing element for processing of the packet by the first PP packet processing element;
 queuing, at a first ordering unit, a first instance of the packet according to an order of the packet within the data flow so that the order of the packet within the data flow is maintained while multiple packets in the data flow are processed in parallel by the two or more PP packet processing elements;
 causing the first instance of the packet to be transmitted when both of (i) processing of the first instance of the packet by the first PP packet processing element is completed and (ii) the first instance of the packet is at a head of a queue at the first ordering unit;
 queuing, at a second ordering unit, a second instance of the packet according to the order of the packet within the data flow; and
 causing the second instance of the packet to be transmitted when both of (i) processing of the second instance of the packet is completed and (ii) the second instance of the packet is at a head of a queue at the second ordering unit.

2. The method of claim 1, further comprising assigning, by the first ordering unit, a first packet ID to the packet, wherein queuing the first instance of the packet comprises queuing the first packet ID assigned to the packet.

3. The method of claim 2, further comprising:
issuing, by the first PP packet processing element, a first instruction indicating that processing of the first instance of the packet has been completed, and
storing the instruction at the first ordering device;
wherein causing the first instance of the packet to be transmitted when the first instance of the packet is at the head of the queue at the first ordering device is based on the stored first instruction.

4. The method of claim 3, wherein the first instruction includes at least (i) the first packet ID and (ii) an indication that the first instance of the packet is not a last instance of the packet to be transmitted by the network device.

5. The method of claim 4, further comprising, after causing the first instance of the packet to be transmitted:
assigning, by the second ordering unit, a second packet ID to the packet;
providing the second packet ID to one of the PP packet processing elements;
issuing, by the one PP packet processing element, a second instruction indicating that processing of the second instance of the packet has been completed; and
providing the second instruction to the second ordering unit, wherein the second instruction includes the second packet ID.

6. The method of claim 5, wherein
assigning the first packet ID to the packet comprises assigning the first packet ID from a pool of non-sequential free packet IDs local to the first ordering unit; and
assigning the second packet IP to the packet comprises assigning the second packet ID from a pool of non-sequential free packet IDs local to the second ordering unit.

7. The method of claim 6, wherein causing the first instance of the packet to be transmitted includes:
forwarding the first instance of the packet to a target port for transmission of the first instance of the packet via the target port;
removing the first packet ID from a queue in which the first packet ID is queued at the first ordering unit; and
returning the first packet ID to the pool of free packet IDs at the first ordering unit.

8. The method of claim 5, further comprising after causing the first instance of the packet to be transmitted, sending a request for the second packet ID from the first ordering unit to the second ordering unit, wherein assigning the second packet ID is performed by the second ordering unit in response to receiving the request from the first ordering unit.

9. The method of claim 1, wherein queuing the first instance of the packet includes:
queuing the first instance of the packet in a default class queue,
assigning the first instance of the packet to a packet class, and
when the first instance of the packet reaches a head of the default class queue, moving the first instance of the packet from the head of the default class queue to a tail of a queue that corresponds to the assigned packet class.

10. The method of claim 8, wherein queuing the first instance of the packet in the default class queue comprises queuing the first instance of the packet in a default class queue corresponding to a source port via which the packet was received by the network device.

11. A network device, comprising:
a plurality of network ports configured to receive and to transmit packets on a network;
a plurality of parallel processing (PP) packet processing elements configured to process packets received via the network ports; and
a plurality of ordering units including at least a first ordering unit and a second ordering unit, the first ordering unit configured to:
distribute a plurality of packets among two or more PP packet processing elements for processing of the packets, wherein the plurality of packets belong to a data flow,
queue a first instance of a packet of the plurality of packets according to an order of the packet within the data flow so that the order of the packet within the data flow is maintained while multiple packets in the data flow are processed in parallel by the plurality of PP packet processing elements,
cause the first instance of the packet to be transmitted when both of (i) processing of the first instance of the packet by a first PP packet processing element, among the plurality of PP packet processing elements, is completed and (ii) the first instance of the packet is at a head of a queue at the first ordering unit, and
cause a second instance of the packet to be queued according to an order of the packet within the data flow; and
wherein the second ordering unit is configured to cause the second instance of the packet to be transmitted when both of (i) processing of the second instance of the packet is completed and (ii) the second instance of the packet is at a head of a queue at the second ordering unit.

12. The network device of claim 11, wherein the first ordering unit is further configured to assign a first packet ID to the packet, and wherein queuing the first instance of the packet comprises queuing the first packet ID assigned to the packet.

13. The network device of claim 12, wherein the first ordering unit is further configured to:
receive, from the first PP packet processing element, a first instruction indicating that processing of the first instance of the packet has been completed,
store the first instruction; and
cause the first instance of the packet to be transmitted (i) when the first instance of the packet is at the head of the queue in which the first instance of the packet is queued and (i) based on the stored first instruction.

14. The network device of claim 13, wherein the first instruction includes (i) the first packet ID and (ii) an indication that the first instance of the packet is not a last instance of the packet to be transmitted by the network device.

15. The network device of claim 13, wherein the first ordering unit is configured to, after causing the first instance of the packet to be transmitted:
forward, to the second ordering unit, a request for the second ordering unit to assign a second packet ID to the packet;
receive, from the second ordering unit, the second packet ID assigned to the packet by the second ordering unit; and
provide the second packet ID to a PP packet processing element processing the packet.

16. The network device of claim 15, wherein the PP packet processing element to which the second packet ID is provided is configured to
- issue a second instruction indicating that processing of the second instance of the packet has been completed; and
- provide the second instruction to the second ordering unit, wherein the second instruction includes the second packet ID.

17. The network device of claim 15, wherein
- the first ordering unit is configured to assign the first packet ID from a pool of non-sequential free packet IDs local to the first ordering unit; and
- the second ordering unit is configured to assign the second packet ID from a pool of non-sequential free packet IDs local to the second ordering unit.

18. The network device of claim 17, wherein the first ordering unit is configured to cause the first instance of the packet to be transmitted at least by:
- sending the first instance of the packet to a target port for transmission of the first instance of the packet from the target port;
- removing the first packet ID from a queue in which the first packet ID is queued at the first ordering unit; and
- returning the first packet ID to the pool of free packet IDs at the first ordering unit.

19. The network device of claim 11, wherein the first PP packet processing element is configured to assign the packet to a packet class, and wherein the first ordering unit is further configured to, prior to the packet being assigned to the packet class, queue the first instance of the packet in a queue corresponding to a default packet class.

20. The network device of claim 19, wherein the default class queue corresponds to a source port via which the packet was received by the network device.

* * * * *